United States Patent [19]

Elluin

[11] Patent Number: 4,902,853
[45] Date of Patent: Feb. 20, 1990

[54] ELECTRICAL OR LIKE ENERGY TRANSPORT INSTALLATION AND METHOD OF IMPLEMENTING SAME

[75] Inventor: Patrice Elluin, Paris, France

[73] Assignee: Societe d'Adminiatration et de Realisationsd'Investissements (SARI), Paris, France

[21] Appl. No.: 227,236

[22] Filed: Aug. 2, 1988

[30] Foreign Application Priority Data

Aug. 3, 1987 [FR] France ................... 87 11015

[51] Int. Cl.⁴ .............................. H02G 3/28
[52] U.S. Cl. ......................... 174/48; 52/221
[58] Field of Search ............. 174/48, 49; 52/220, 52/221

[56] References Cited

U.S. PATENT DOCUMENTS 2,076,650  4/1937  Kettron .................. 174/49
3,166,631  1/1965  Reiland ................... 174/49

FOREIGN PATENT DOCUMENTS 2211061  9/1973  Fed. Rep. of Germany .
2050869  4/1971  France .

Primary Examiner—A. T. Grimley
Assistant Examiner—David A. Tone

[57] ABSTRACT

An installation for transporting electrical or like energy between a technical facility and locations dispersed on a platform comprises centralized transmit and receive arrangements for the electrical or like energy in the technical facility and, incorporated into the platform, a predetermined number of independent closed boxes distributed according to a specific plan and ducts each of which emerges into the technical facility and connects a respective one of the boxes to the technical facility independently of the other ducts. According to the requirements for connection between a specific location on the platform and specific electrical or like energy transmit and receive arrangements, it is possible to determine which box is nearest the location, to open the box through the platform, to insert into the associated duct at least one electrical or like energy cable or the like and to connect the cable or the like to the specific electrical or like energy transmit and receive arrangements in the technical facility.

10 Claims, 3 Drawing Sheets

ELECTRICAL OR LIKE ENERGY TRANSPORT INSTALLATION AND METHOD OF IMPLEMENTING SAME

BACKGROUND OF THE INVENTION

1. Field of the Invention

The present invention concerns a method for implementing an installation for transporting electrical or like energy between a technical facility and locations dispersed on a platform, and also an installation implemented by this method.

Generally speaking, the term "electrical energy" is to be understood as meaning both electrical current and electrical signals and the term "transport" is to be understood as meaning both distribution from the technical facility to the dispersed locations and transmission to the technical facility from the dispersed locations; for the purposes of the present invention, it is to be understood that the expression "electrical or like energy" means electrical energy and any form of energy transportable by cable, duct or generally flexible tube, such as for example light energy in the visible or invisible spectrum, notably but not exclusively in the form of modulated signals for telephone or data processing use, transported by optical fiber or cable, mechanical energy transported by funicular transmission in a sheath (Bowden cables, for example) and pneumatic or hydraulic energy transported by flexible hoses; for the purposes of this invention, the term "cable or the like" is to be understood as meaning a cable, fiber, duct, tube, sheath or hose used to transport these various forms of energy. The present invention is therefore equally applicable to supplying regulated or unregulated electrical power to the various locations, to providing a telephone or data processing service to them, and to transmitting to the technical facility from the various locations instructions for controlling devices located in or controlled from the technical facility, for example air conditioning, lighting and blind opening and closing mechanisms, these examples being in no way limiting and being given merely to demonstrate the extensive field of application of the invention.

The term "platform" is be understood as meaning the entire floor of one story of a building, usually constructed without partition walls and intended to be divided by partition walls subsequently according to requirements, with the possibility of modifying the arrangement of partition walls; by extension, the term "platform" is to be understood as also meaning the walls, curtain walls and partition walls of this story of the building which are in principle not removable.

2. Description of the Prior Art

Providing an installation for transporting electrical or like energy in a platform of this kind during construction of the building raises specific problems related to the fact that during construction it is not generally known where the socket outlets, switches, telephone and computer jacks and the like will be located; because of this, the installation for transporting electrical or like energy implemented simultaneously with construction of the building must offer great flexibility of connection to suit the eventual arrangement of partition walls, which arrangement is also subject to subsequent modification.

Given this requirement, use is currently made of various methods for implementing installations for transporting electrical or like energy, generally limited to supplying the platform with electric power.

One known technique entails providing in the ceiling or under a false floor a fixed electrical power supply network incorporating numerous junction boxes so that connections may be made and unmade according to requirements; this technique, as described for example in German patent application DE-A-2 211 061 in the case of a ceiling installation, is costly because of the length of the electric cable required for installing a sufficiently dense network to meet all requirements, and because of the number of junction boxes that it is therefore necessary to provide; further, in the specific case of an installation under a false floor, the need to provide the false floor means that each story has to be made taller leading to increased construction costs, to increased heating and air conditioning energy consumption because of the increase in losses through the walls, since the surface area of the walls is increased, and to a reduction in the number of storeys that can be provided in a building for a maximum permissible height; also, access to the junction boxes can be difficult.

In another known technique service is provided to the platform by providing an electrical power supply baseboard on the walls to which connections may be made at will; this technique offers great flexibility of connection for locations situated directly adjacent the wall, but its use is necessarily limited to this level; also, it is costly in that the electric power supply network accommodated in the baseboard necessarily follows the longest perimeter of the platform, which requires long cable runs.

Use is also made of a technique whereby the platform incorporates socket outlets at judiciously chosen locations to meet any subsequent requirement, together with ducts protecting the cables connecting these socket outlets to the technical facility; in the frequent case where the platform is manufactured from a cast material such as concrete the socket outlets and the ducts are embedded in the concrete, and the ducts can be located under the ceiling of the floor immediately below; this systematic technique has the disadvantage of being particularly costly because of the length of the cable runs that it requires, together with the need to protect the floor-mounted socket outlets for reasons of safety; the esthetic results of this technique are also mediocre because of the visible nature of the floor-mounted socket outlets.

A variation on this technique, as described in U.S. Pat. No. 3,166,631, consists not in fitting the socket outlets during the manufacture of the platform but rather in embedding in the latter, made from concrete, rigid profiled members which accommodate cables in the same way as the aforementioned ducts; these rigid profiled members incorporate, regularly spaced along their length, attached appendices in the form of boxes that can be opened up through the platform for making electrical connections as and where required; the esthetic result of this technique is better than that of the technique previously referred to since only the connections actually made are visible; however, because of its systematic character, accentuated by the rigidity of the profiled members that have to be provided in large numbers to serve the platform as a whole, it has the disadvantage of requiring long cable runs, resulting in high cost; this disadvantage is all the more severe in that the connection of the rigid profiled members to the technical facility entails complex cable paths, which has the further disadvantage of considerably complicating wiring operations.

An object of the present invention is to remedy these disadvantages of the known techniques.

SUMMARY OF THE INVENTION

In one aspect, the present invention consists in a method for implementing an installation for transporting electrical or like energy between a technical facility and locations dispersed on a platform using centralized transmit and receive means for said electrical or like energy in said technical facility, said method comprising:

incorporating into said platform, during its manufacture, a predetermined number of independent closed boxes distributed according to a specific plan chosen at will and ducts each of which emerges into said technical facility and connects a respective one of said boxes to said technical facility independently of the other ducts, which correspond to the other boxes, respectively, and determining, according to the requirements for connection between a specific location on said platform and specific electrical or like energy transmit and receive means, which box is nearest said location, opening said box through said platform, inserting into the associated duct at least one electrical or like energy cable or the like and connecting said at least one cable or the like to said specific electrical or like energy transmit and receive means.

In another aspect, the present invention consists in an installation for transporting electrical or like energy between a technical facility and locations dispersed on a platform, comprising centralized transmit and receive means for said electrical or like energy in said technical facility and, incorporated into said platform, a predetermined number of independent closed boxes distributed according to a specific plan chosen at will and ducts each of which opens emerges into said technical facility and connects a respective one of said boxes to said technical facility independently of the other ducts, which correspond to the other boxes, respectively whereby, according to the requirements for connection between a specific location on said platform and specific electrical or like energy transmit and receive means, it is possible to determine which box is nearest said location, to open said box through said platform, to insert into the associated duct at least one electrical or like energy cable or the like and to connect said at least one cable or the like to said specific electrical or like energy transmit and receive means.

The cost of an installation of this kind is lower than that of an installation produced by the aforementioned known technique in that, for a given use of the platform, only the ducts associated with the boxes nearest the locations at which connections are required to be made are wired, and this exclusively depending on the requirements specific to those locations, that is to say, for example, to provide only a telephone or data processing service if only this type of service is needed, or only an electrical power supply service if only this service is needed, or only the capability to remote control equipment situated in or controlled from the technical facility where such is the specific requirement, the same duct corresponding to the same box being able to accommodate cables or the like corresponding to different requirements; the installation implemented in accordance with the present invention offers all the required flexibility with regard to adaptation to different requirements, since it is possible to extract one or more cables or the like from a duct if the corresponding requirements no longer apply, to close the corresponding box if no longer used and to open up another box to insert cables or the like into the corresponding duct, according to new requirements; the identification of a box so that it can be opened can be effected in a secure way if, as in a preferred embodiment of the present invention, each box has dimensions larger than positional tolerances for the platform; if the platform is manufactured from a cast material such as concrete and the closed boxes and the ducts are incorporated into the platform by embedding them in this material during casting, it has been found that the use in the platform of cylindrical boxes with their axis of revolution vertical and with a diameter of 18 cm makes it possible to detect each box shown on a plan with certainty, despite possible inaccuracies in positioning and possible movements during casting of the concrete or like material.

It will be noted that when the present invention is used not only is the position of each box on the platform known, to a certain tolerance, but also the length of each duct between the corresponding box and the technical facility is known, to a certain tolerance; because of this, before an electrical connection cable or the like is inserted into a specific duct it is possible, according to a preferred embodiment of the present invention, to prefabricate the cable or the like to a length exceeding by a specific amount the specific length of the duct and to fit the cable or the like with means for connecting it to the corresponding electrical or like energy transmit and receive means, before inserting the cable or the like into the duct; the cable or the like can be prefabricated in a manufacturing plant, under optimum conditions of cost and safety; by appropriately choosing the aforementioned specific amount of excess length, it is possible to avoid the wastage of cable or the like that necessarily results with traditional techniques of wiring ducts, whereby an excess length of cable or the like is provided as a safety precaution and cut off when wiring is complete, which wastage can be considerable; the cable or the like is, of course, preferably pre-fitted with connection means at both ends.

It will be noted that as each duct can connect the corresponding box to the technical facility by the shortest path, generally meaning a straight line path, each duct is of the minimal length and so therefore is each cable or the like, representing a further saving.

Because of the facility to choose at will the plan according to which the boxes are distributed on the platform, by virtue of their mutual independence, it is possible to allow, in making this choice, for greater or lesser probabilities of requirements for connection according to the locations on the platform and, for example, to provide a greater density of boxes in certain areas of the platform, intended after manufacture of the latter to constitute working areas, than in other areas of the platform, intended to constitute entrance lobbies or relaxation areas, for example.

An additional advantage of an installation in accordance with the present invention is that it is possible to identify unambiguously in the technical facility the respective emergences of the ducts associated with the various boxes; in a preferred embodiment of the present invention the emergences of the ducts into the technical facility are aligned in a specific direction and the electrical or like energy transmit and receive means are of linear form in the specific direction and juxtaposed to the emergences of the ducts transversely to the specific direction; this facilitates identifying the cables or the like associated with each duct, in other words identifying each connection when making or removing connections.

Other characteristics and advantages of the invention will emerge from the following description given by way of non-limiting example only with reference to the appended drawings which constitute an integral part of the description.

DESCRIPTION OF THE PREFERRED EMBODIMENT

Figure 1:
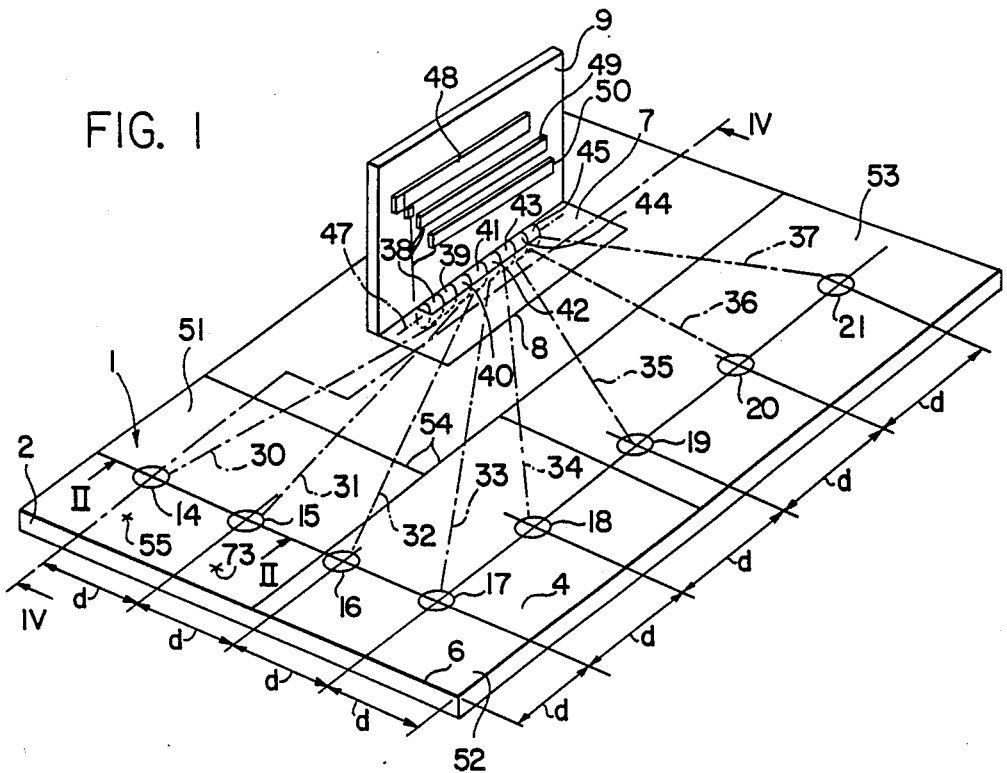
FIG. 1 is a schematic view in perspective of an installation in accordance with the present invention.

Above a platform 1 in the form of a horizontal floor slab 2 of concrete, for example, is a horizontal ceiling slab 3, also of concrete, for example. The floor slab 2 has a plane horizontal upper surface 4 delimited at the outside 5 of the building by a periphery 6 which is polygonal, for example. The upper surface 4 of the floor slab 2 defines the floor of the platform 1.

On the platform is a technical facility 7 of which are shown the contour 8 on the surface 4 (FIG. 1) and two partition walls 9, 10 separating it from the remainder of the platform. An electrical power supply cable 11 terminates in the technical facility 7, advantageously incorporating metering means and a circuit-breaker (not shown inside the technical facility 7), as do a telephone cable 12 connected to a telephone switchboard (not shown) situated on the platform 1 outside the technical facility 7 or on another platform and a cable 13 connected to a computer (not shown) also located on the platform 1 outside the technical facility 7 or on another platform. In this preferred embodiment of the present invention, the cables 11, 12, 13 are respectively connected inside the technical facility 7 to a straight horizontal electrical power distribution busbar 48 enabling connections to be made and removed at will along its length (for example, of the kind distributed under the tradename "CANALISATIONS CANALIS KJ" by the French company "LA TELEMECANIQUE" of 33 bis avenue Maréchal Joffre - 92002 NANTERRE CEDEX, France), a straight horizontal telephone distribution busbar 49 and a straight horizontal computer distribution busbar 50, all parallel to each other and fixed to the partition wall 9 of the technical facility 7 in the example shown. The technical facility 7 may also enclose a set of air conditioning modules as described in French patent application No. 87 09630 filed 7 July 1987.

Figure 2:
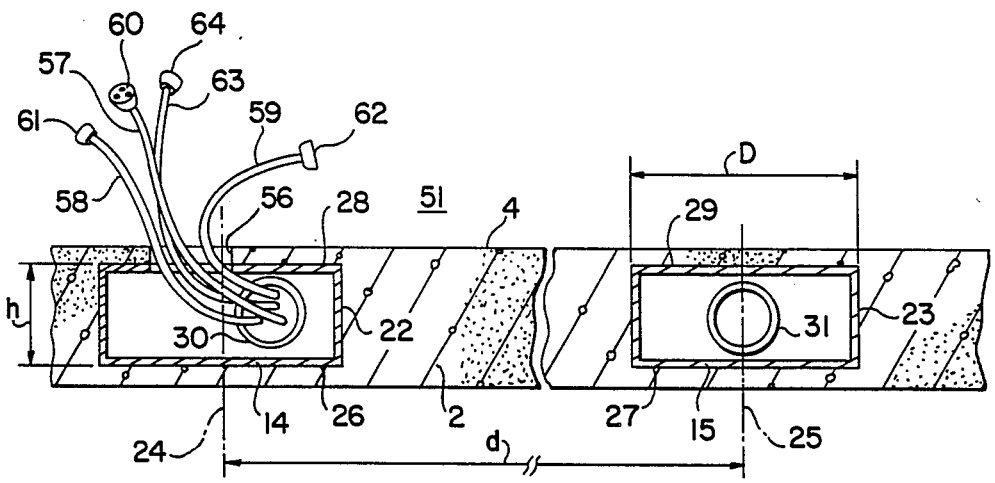
FIG. 2 shows the platform, in practice a concrete floor slab, in cross-section on the vertical plane denoted II—II in FIG. 1 passing through two of the boxes of which one is wired and the other is not wired.
Figure 3:
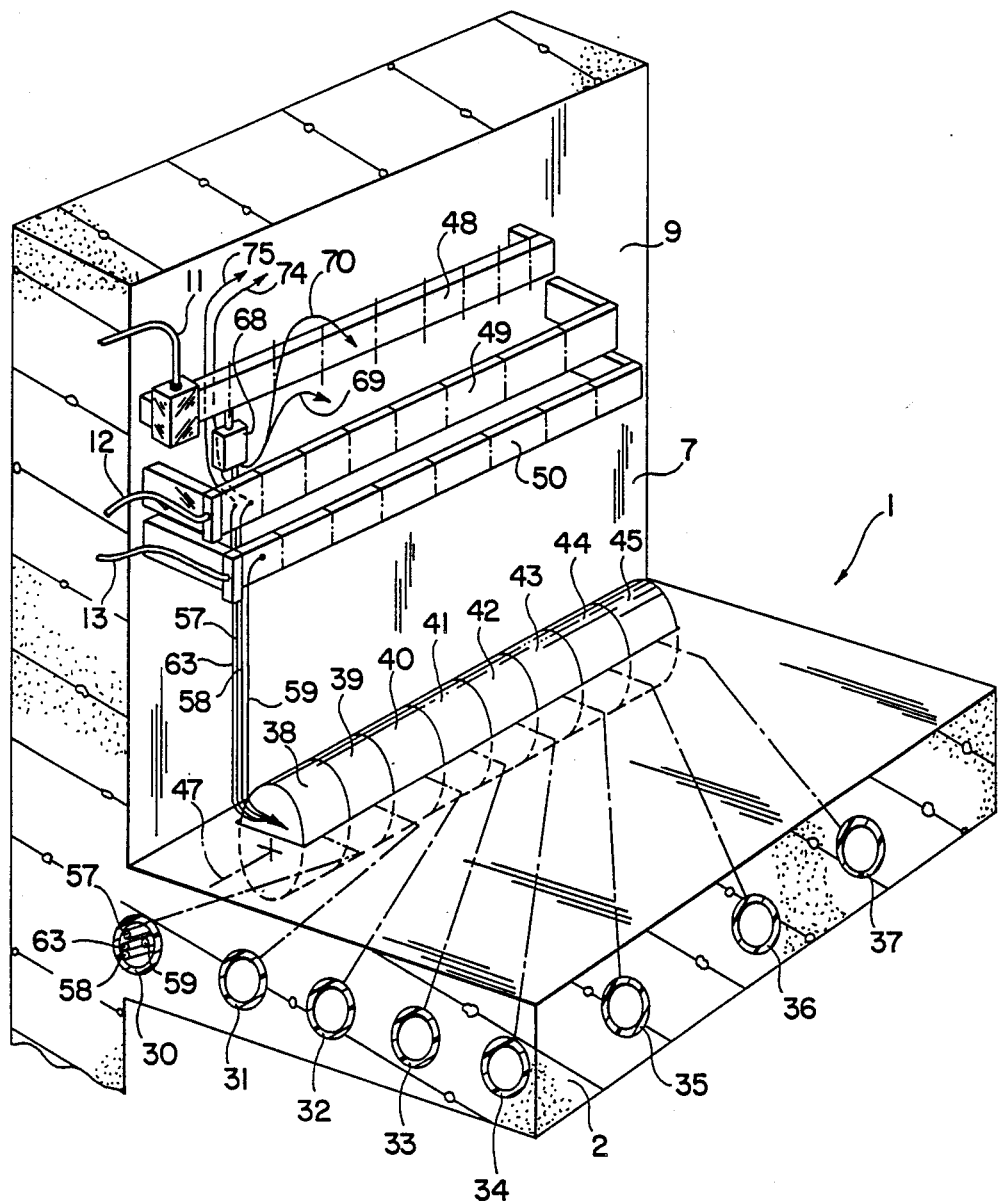
FIG. 3 is a view analogous to that of FIG. 1 showing a detail of the technical facility.

To provide for numerous possibilities of connection between one or more of the cables 11, 12, 13 terminating in the technical facility 7, on the one hand, and the dispersed locations on the platform 1, on the other hand, as requirements change after the construction of the building of which the platform 1 forms part, mutually independent closed boxes 14 through 21 a specific number and distributed according to a specific plan, freely predetermined to estimated future requirements, are incorporated into the platform 1, to be more precise embedded in the floor slab 2 in the example shown; as shown in FIG. 2 in particular, with regard to boxes 14 and 15, each box has for example a peripheral wall 22,23 that is a cylinder of revolution about a vertical axis 24,25, a flat horizontal bottom wall 26, 27 and a flat horizontal top wall 28, 29; the height h of each box as measured between its top and bottom walls is less than the thickness E of the floor slab 2, so that the top and bottom walls of each box are entirely covered and concealed by a layer of the material from which the floor slab 2 is made, namely concrete in this example. The various boxes 14 and 21 are therefore concealed, but they are nevertheless easy to locate in that they are disposed according to a predetermined plan and in that their horizontal dimensions are greater than the tolerances governing their locations in the platform 1; in the example shown the boxes 14 through 21 are therefore aligned parallel to the peripheral edge 6 of the upper surface 4 of the floor slab 2, at the same distance d from the latter and being spaced from each other in pairs by this distance d, which may be 1.30 m, for example; other arrangements can equally well be chosen without departing from the scope of the present invention providing that they correspond to a predetermined plan that is known after construction of the platform 1; also, the example shown the outside peripheral wall 23 of each box has a diameter D in the order of 18 cm, it being understood that a different diameter can be chosen provided that it is compatible with the tolerances for positioning of the boxes 14 through 21 in the floor slab 2 of the platform 1; it will be noted that a shape different than that described may be adopted for each of the boxes 14 through 21 provided that it enables each box 14 through 21 to be located with certainty, from the plan, through the floor slab 2.

Also, the floor slab 2 contains and conceals ducts 30 through 37 which in this example are provided in equal numbers to the boxes 14 through 21 and each of which connects a respective box to the technical facility 7 where it emerges from the floor slab 2 through the upper surface 4 thereof and through the intermediary of a respective box 38 through 45, identical to the boxes 14 through 21 and partially embedded in the floor, in positions where the axes of the various boxes 38 through 45 are horizontal and aligned relative to each other; the boxes 38 through 45 through which the ducts 30 through 37 emerge in a horizontal alignment or direction 47 which is that of their axes and in an ordered arrangement enabling each of them to be identified with certainty, as well as the box 14 through 21 to which it corresponds; this alignment 47 is parallel to the electrical power busbar 48 and to the busbars 49 and 50 which are superposed vertically and to the boxes 38 through 45; where the floor slab 2 is made from concrete, as in this example, the ducts 30 through 37 and the boxes 38 through 45 are embedded in the concrete at the same time as the boxes 14 through 21 during casting of the slab 2.

With each of the boxes 14 through 21 distributed over the platform 1 there is therefore associated a respective box 38 through 45 in a precisely determined position in the technical facility 7 and the two boxes associated in this way are connected to each other by a duct 30 through 37 which is empty, that is to say which does not contain any cables or the like, during the manufacture of the floor slab 2; it will be noted that each of the ducts 30 through 37 can be placed independently of any requirement for future partitioning of the platform 1, that is to say in practice according to an arrangement as close as possible to the straight line arrangement, as shown in FIG. 1, that is to say with the minimal length which is furthermore known with relative accuracy.

In an alternative embodiment (not shown) several of the boxes distributed over the platform 1, such as the boxes 14 through 21, could be interconnected by ducts similar to the ducts 30 through 37, one only of these boxes being then connected to the technical facility 7 by a duct similar to the ducts 30 through 37 or possibly with no connection to the technical facility; in this case the length of each duct would also be known with relative accuracy and the emergence into the floor of the technical facility 7 of the duct providing the connection between a group of boxes and the technical facility 7 would also be unambiguously identified.

The boxes 14 through 21, the ducts 30 through 37, the boxes 38 through 45, the electrical power busbar 48 and the busbars 49 and 50 together with the corresponding cables 11, 12, 13 constitute the permanent infrastructure of an electrical or like energy transport installation according to the present invention, that is to say the infrastructure usually implemented integrally with handover of the platform 1 to a user who then, according to his own connection requirements and according to partitioning 54 on the platform 1 to subdivide it into rooms 51, 52, 53, completes this infrastructure in the way now to be described.

Figure 4:
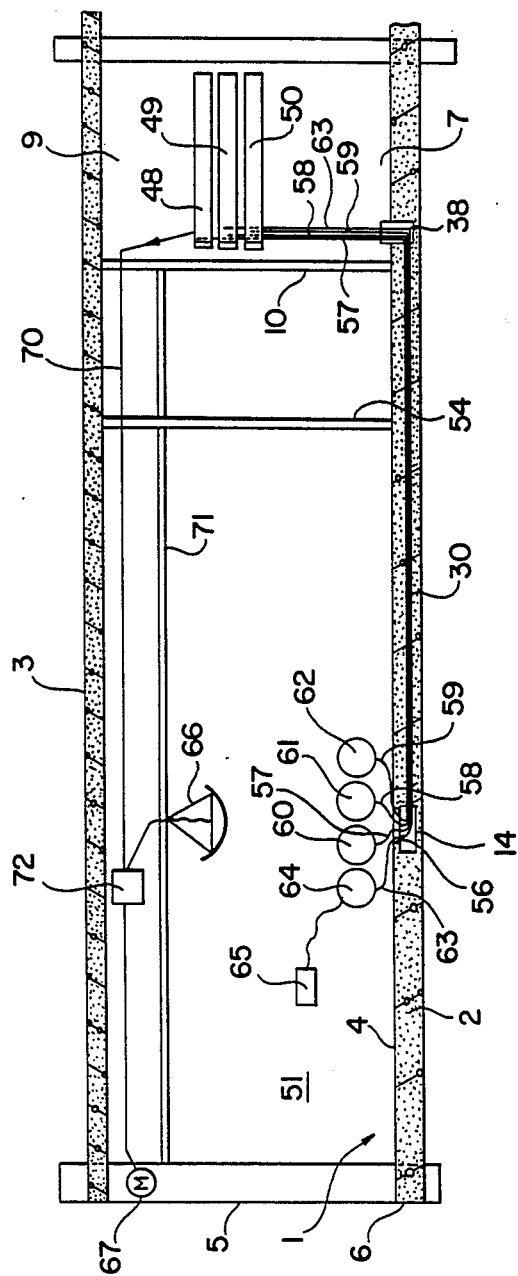
FIG. 4 shows in cross-section on the vertical planes denoted IV—IV in FIG. 1 the wiring possibilities between a room and the technical facility as provided by the present invention.

This description will concentrate exclusively and by way of non-limiting example on the room 51 to which correspond the boxes 14 nd 15 and which is shown in FIGS. 1, 2 and 4 in particular, it being understood that the rooms 52 and 53 to which respectively correspond the boxes 17 and 18 and the boxes 19 through 21 may be equipped in a similar way.

It will be assumed by way of non-limiting example that in this room an electrical power supply, a telephone connection and a computer connection are needed at the location 55, where a desk is situated, for example, and which from examination of the plan of the platform 1 is found to be between the line joining the boxes 14 and 15 and the outside 5 of the building, nearer the box 14 than the box 15.

Given these conditions, the box 15 is left closed and embedded in the material of the floor slab 2, in practice concrete, and the corresponding duct 31 is left without any cables in it, as shown in FIG. 2; however, the box 14 nearest the location 55 is located as accurately as possible on the surface 4 of the slab 2 and the layer of the material of the floor slab 2 between the wall 28 of the box 14 and the upper surface 4 of the floor slab 2 and then the wall 28 itself are drilled through to open the box 14 upwardly through the material of the floor slab 2 and so gain access to the corresponding duct 30 through the box 14 and through the hole 56 formed in this way in the material of the floor slab 2 and in the upper wall 28 of the box 14; likewise, the box 38 corresponding to the emergence of the duct 30 into the floor of the technical facility 7 is opened upwardly.

Then, after determining with a certain tolerance the length of the duct 30 by reading the plan of the platform 1, three cables are prefabricated, preferably in a manufacturing plant, to a length corresponding to the length of the duct 30 as shown on the plan increased by a specific amount; these three cables are an electrical power supply cable 57, a telephone cable 58 and a computer cable 59, both ends of each of these cables preferably being fitted during its prefabrication with appropriate connection means, namely a respective female connector 60, 61, 62 at one end of each cable intended to exit the duct 30 through the hole 56 in the room 51 and respective means for connection to the electrical power busbar 48, the busbar 49 and the busbar 50 at the other end, designed to emerge from the duct into the technical facility 7 through the associated box 38.

The three cables 57, 58, 59 are then inserted into the duct 30, separately or together, and respectively connected to the busbar 48, the busbar 49 and the busbar 50, at a location on each of these preferably situated vertically above or approximately vertically above the box 38; the user of room 51 can then plug into the respective connectors 60, 61, 62 any electrically powered device, a telephone and a computer terminal; the length of each of the cables 57, 58 and 59 is preferably computed so that after their respective connection to the busbar 48, the busbar 49 and the busbar 50 each of the three cables has a section situated outside the box 14 and the hole 56 inside the room 51.

If the user of room 51 does not use a computer terminal, for example, the cable 39 is naturally not inserted into the duct 30; likewise, if the user of room 51 ceases to use a computer terminal after having used one the corresponding cable 59 can be removed from the duct 30 after unplugging it from the busbar 50 and this cable 59 may be subsequently re-used either in another duct of approximately the same length as the duct 30 or in the duct 30 again.

Generally speaking, once a box like the box 14 is opened it is possible to insert into the corresponding duct like the duct 30 or to remove therefrom any type of cable designed to transport any kind of electrical energy between the vicinity of the box and the technical facility 7.

The cables inserted in this way into a duct like the duct 30 can be intended not only to supply electrical power, to transmit telephone signals and to transmit data signals, as described, but also to transmit currents or signals corresponding to other functions. More specifically, FIG. 2 shows the case where there is advantageously inserted into the duct 30 an auxiliary cable 63 provided in the room 51 with an appropriate connector 64. The cable 63 runs from a box 65 that may be mobile and adapted to be placed on a desk near the location 55 and appropriately connected to the cable 64. Remote control of a number of devices such as an air conditioning unit associated with the room 51 and situated in the technical facility 7, is described in the aforementioned French patent application. The lighting of the room 51 is schematically represented at 66 in FIG. 4, and the operation of a motor 67 operating a blind (not shown) of the room 51, placed on the outside 5 of the building; to this end the auxiliary cable 63 is connected in the technical facility 7, at the level of the telephone busbar 49, in a way that is within the normal competence of those skilled in the art. A cable 74 for remote control of an air conditioning unit (not shown) associated with the room 51 is supplied with electric power by a cable 69 connected to the electrical power busbar 48 by the same connection means 68 as the cable 57, and to a cable 70 which, returning from the room 51 between the ceiling slab 3 and a false ceiling 71, is connected inside the room 51, between the false ceiling 71 and the ceiling slab 3, to a unit 72 for controlling the lighting 66 and to the blind motor 67. Electric power is supplied by a cable 70 connected to the busbar 48 by the connection means 68 which therefore serves to supply electrical power to the room 51 and advantageously comprise corresponding protection means such as a differential circuit-breaker. The foregoing examples are by way of illustration only and are not intended to limit the scope afforded this invention, the claims appended hereto being relied upon for that purpose.

If the use of the room 51 changes subsequently or if the partitioning 54 is replaced by an alternative arrangement, it is possible that there may be no further requirement for supply of electric power to the location 55 and that a requirement for supply of electrical power may arise with regard to another location 73, situated nearer the box 15.

The cables 57, 58, 59, 63 associated with the duct 30 are then removed from it and the hole 56 is closed up (because of its small size it can then be readily hidden, for example under a join in the floor covering); after locating the box 15 on the plan the layer of material constituting the floor slab 2 situated between the top wall 29 of the box 15 and the upper surface 4 of the floor slab 2 and the wall 29 itself are drilled and, after the necessary cables are prefabricated, they may be inserted into the duct 31 so that they emerge into the room 51 through the open box 15 and into the technical facility 7 through the box 39, before making the necessary connections; the same operations can be carried out in respect of all the boxes 14 through 21 distributed over the platform 1 and therefore at any time only those of the ducts 30 through 37 which correspond to a box 14 through 21 situated near a location where there is a requirement for transportation of electrical or like energy are wired, and this with only the cables needed to meet this requirement, which cables are as short as possible; an installation in accordance with the invention is therefore much more economic to implement than any of the known type installations mentioned in the foregoing background of the invention while offering great flexibility, meaning that they are very easy to adapt to user requirements at any time.

Those skilled in the art will naturally understand that although only boxes embedded in the platform floor slab have been described the scope of the present invention would not be exceeded by embedding concealed boxes of this kind also in the walls, curtain walls and partition walls of the platform, according to a predetermined plan so that they can be located and opened according to requirements; the corresponding ducts, for the most part accommodated in the floor slab as described, would also rise appropriately to the boxes in the walls, curtain walls and partition walls, being embedded in the material of the latter; likewise, those skilled in the art will understand that although the invention has been described with reference to the transport of electrical power, it would be equally possible, without departing from the scope of the present invention to run cables, fibers, ducts, tubes, sheathes others or the like, generally flexible, of any type appropriate to transportation of energy.

There is claimed:

1. Method for implementing an installation for transporting energy between a technical facility and locations dispersed on a platform using centralized transmit and receive means for said energy in said technical facility, said method comprising:

incorporating into said platform, during its manufacture, a predetermined number of independent closed boxes distributed according to a specific plan chosen at will and ducts each of which emerges into said technical facility and connects a respective one of said boxes to said technical facility independently of the other ducts, and determining, according to the requirements for connection between a specific location on said platform and specific energy transmit and receive means, which box is nearest said location, opening said box through said platform, inserting into the associated duct at least one cable and connecting said at least one cable to said specific energy transmit and receive means.

2. Method according to claim 1, wherein the dimensions of each box are greater than positioned tolerances for said platform.

3. Method according to claim 1, wherein said platform is manufactured by casting and said boxes and ducts are incorporated into said platform by embedding them in the material of said platform during casting thereof.

4. Method according to claim 1, wherein each duct has a specific length and said at least one cable or the like is prefabricated to a length exceeding by a specific amount the length of the duct corresponding to the box nearest said specific location and fitted with means for connecting it to said specific electrical or like energy transmit and receive means before said at least one cable or the like is inserted in said duct.

5. Method according to claim 1, wherein said ducts emerge into said technical facility, along a mutual alignment in a specific direction and said energy transmit and receive means are of linear form in said specific direction and juxtaposed to the emergences of said ducts into said technical facility transversely to said specific direction.

6. Installation for transporting energy between a technical facility and locations dispersed on a platform, comprising centralized transmit and receive means for said energy in said technical facility and, incorporated into said platform, a predetermined number of independent closed boxes distributed according to a specific plan chosen at will and ducts each of which emerges into said technical facility and connects a respective one of said boxes to said technical facility independently of the other ducts, whereby, according to the requirements for connection between a specific location on said platform and specific energy transmit and receive means, it is possible to determine which box is nearest said location, to open said box through said platform, to insert into the associated duct at least one cable and to connect said at least one cable to said specific energy transmit and receive means.

7. Installation according to claim 6, wherein the dimensions of each box are greater than positional tolerances for said platform.

8. Installation according to claim 6, wherein said platform has been manufactured from a cast material and said boxes and ducts are empedded in said cast materials.

9. Installation according to claim 6, wherein each duct has a specific length, at least one of said boxes is opened through said platform and the duct corresponding to said at least one open box contains at least one cable having a length exceeding the length of the duct, said at least one cable emerging into the corresponding open box and into said technical facility and being fitted with means for connecting it to said specific energy transmit and receive means in said technical facility.

10. Installation according to claim 6, wherein said ducts emerge into said technical facility, along a mutual alignment in a specific direction and said energy transmit and receive means are of linear form in said specific direction and juxtaposed to the emergences of said ducts into said technical facility transversely to said specific direction.

* * * * *

UNITED STATES PATENT AND TRADEMARK OFFICE
CERTIFICATE OF CORRECTION

PATENT NO. : 4,902,853

DATED : February 20, 1990

INVENTOR(S) : Patrice Elluin

It is certified that error appears in the above-identified patent and that said Letters Patent is hereby corrected as shown below:

Title page:

Assignee: "Societe d'Adminiatration et de Realisationsd'Investissements (SARI)" should be --Societe d'Administration et de Realisations d'Investissements (SARI)--.

Col. 10, line 19, "positioned" should be --positional--.

Signed and Sealed this

Twenty-fifth Day of June, 1991

Attest:

HARRY F. MANBECK, JR.

Attesting Officer

Commissioner of Patents and Trademarks